Feb. 23, 1943.　　　R. C. PIERCE ET AL　　　2,311,775
WIRE DRAWING MACHINE
Filed Oct. 27, 1939　　　7 Sheets-Sheet 1

INVENTOR.
ROBERT C. PIERCE
LEONARD G. BERQUIST
BY  Booth & MacDuff
ATTORNEYS

Feb. 23, 1943.   R. C. PIERCE ET AL   2,311,775
WIRE DRAWING MACHINE
Filed Oct. 27, 1939   7 Sheets-Sheet 2
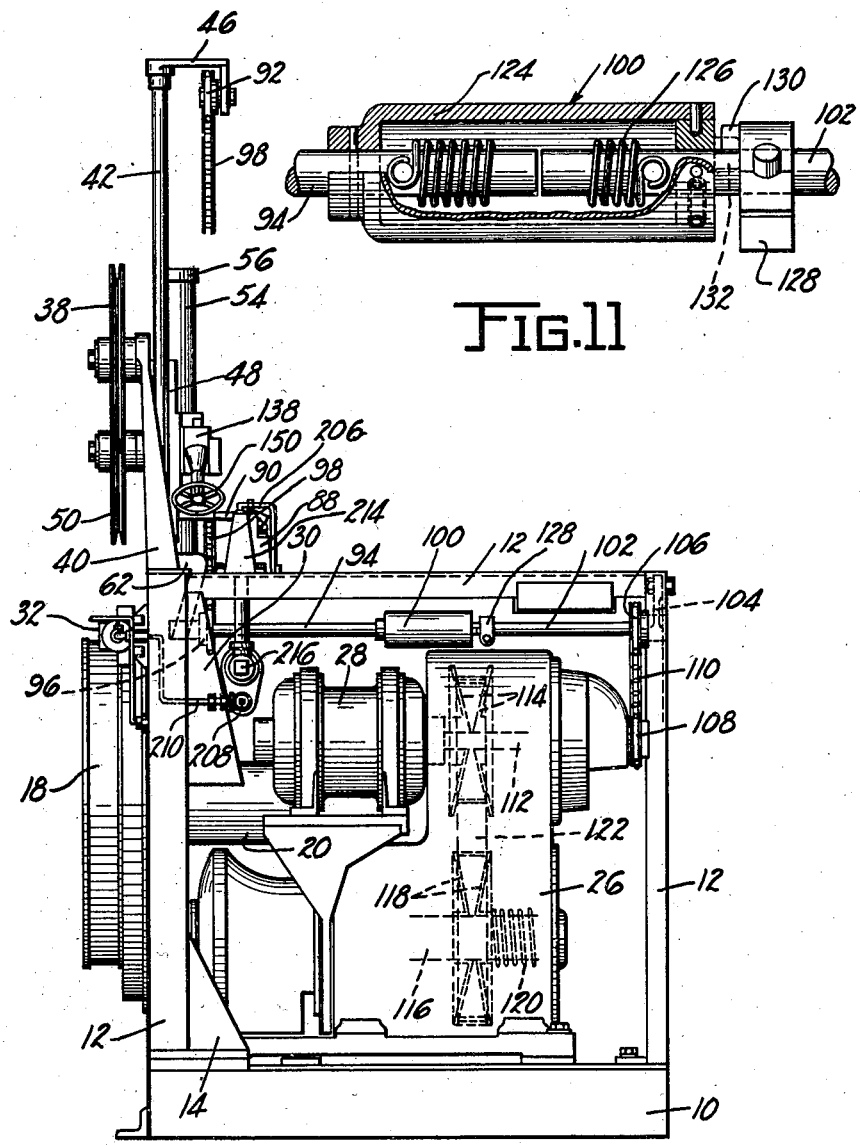
INVENTOR.
ROBERT C. PIERCE
LEONARD G. BERQUIST
BY
ATTORNEYS.

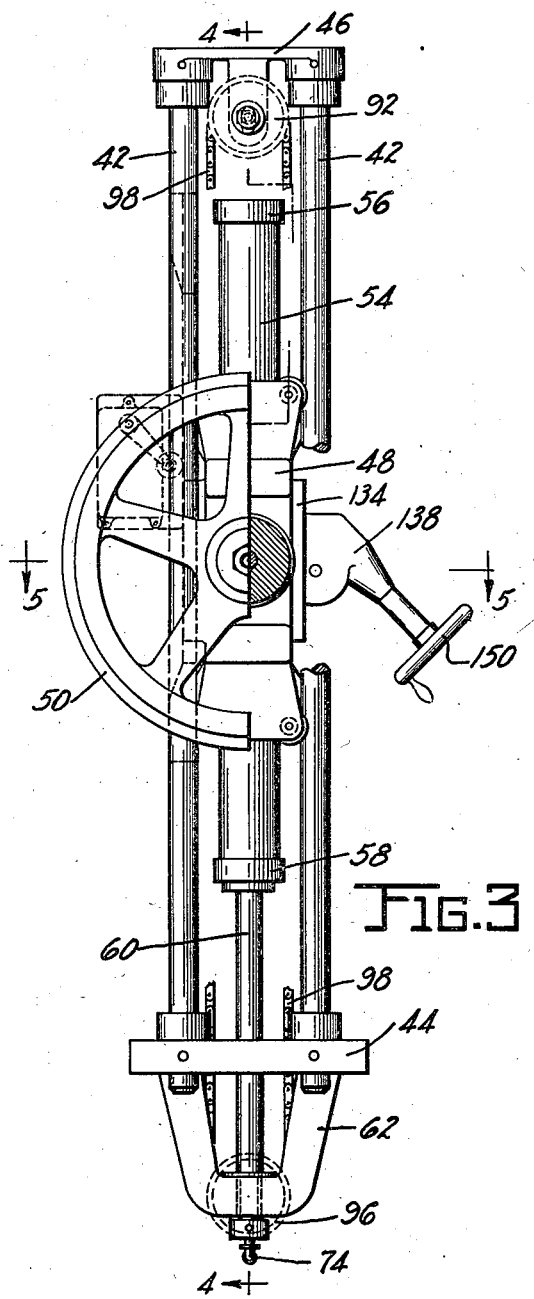
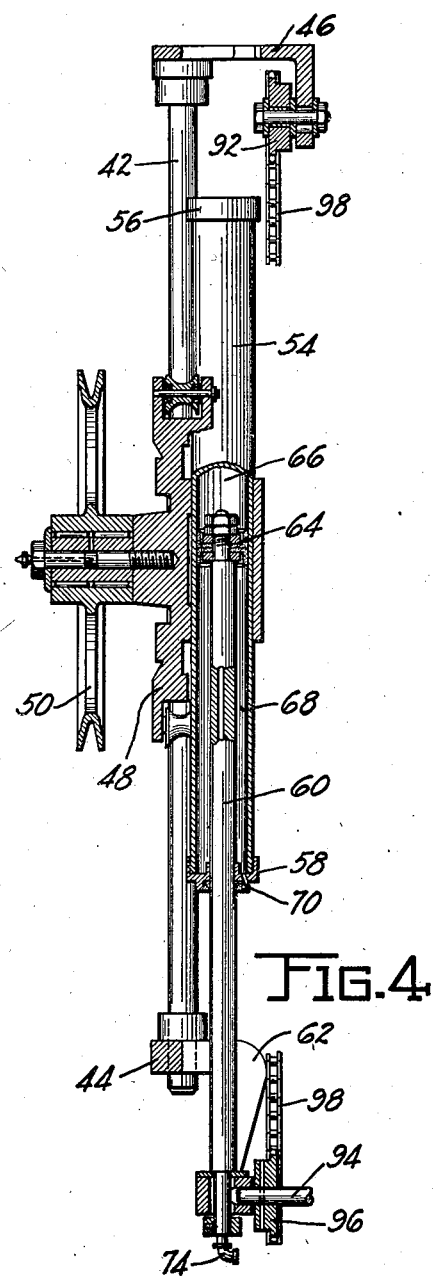

Feb. 23, 1943. R. C. PIERCE ET AL 2,311,775
WIRE DRAWING MACHINE
Filed Oct. 27, 1939 7 Sheets-Sheet 4

INVENTOR.
ROBERT C. PIERCE
LEONARD G. BERQUIST
BY
Booth & MacDuff
ATTORNEYS

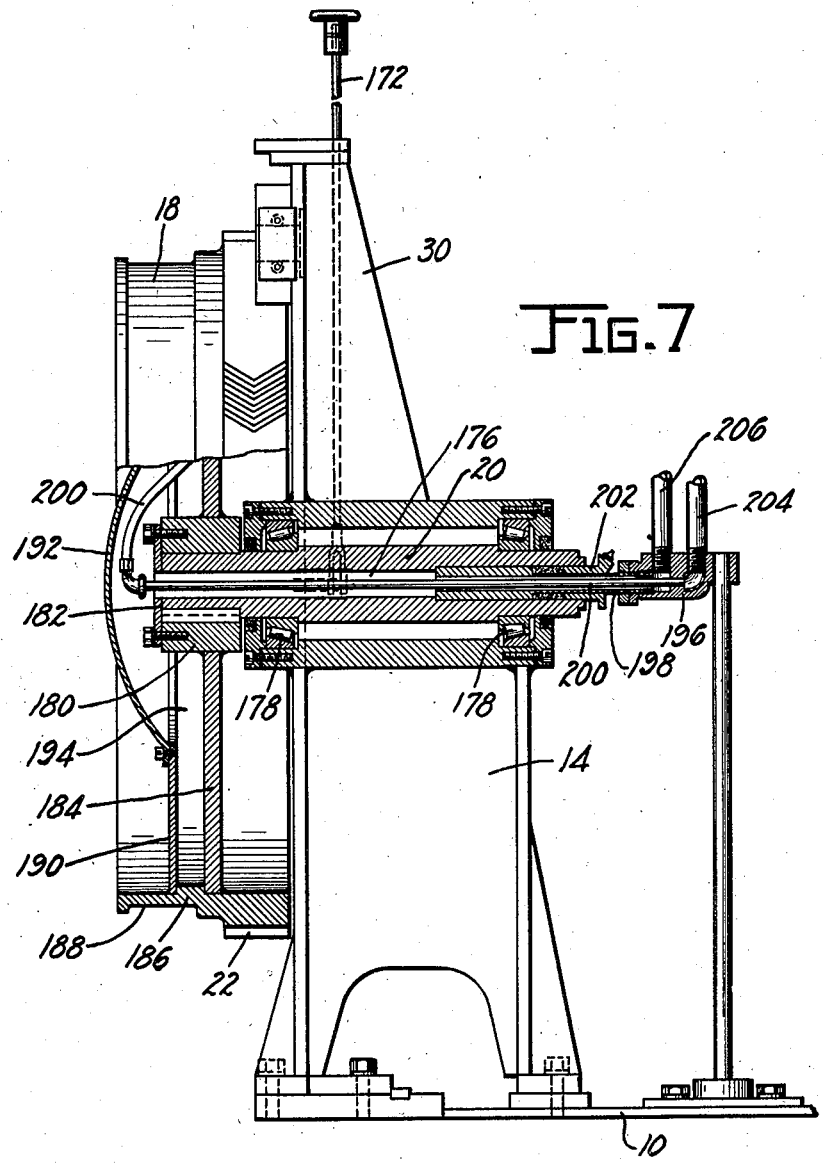

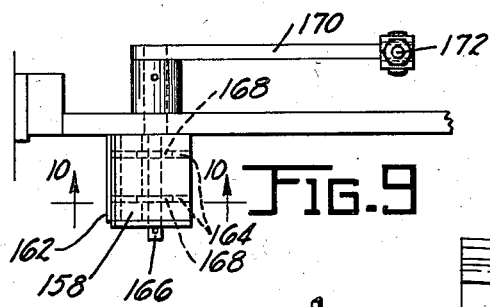
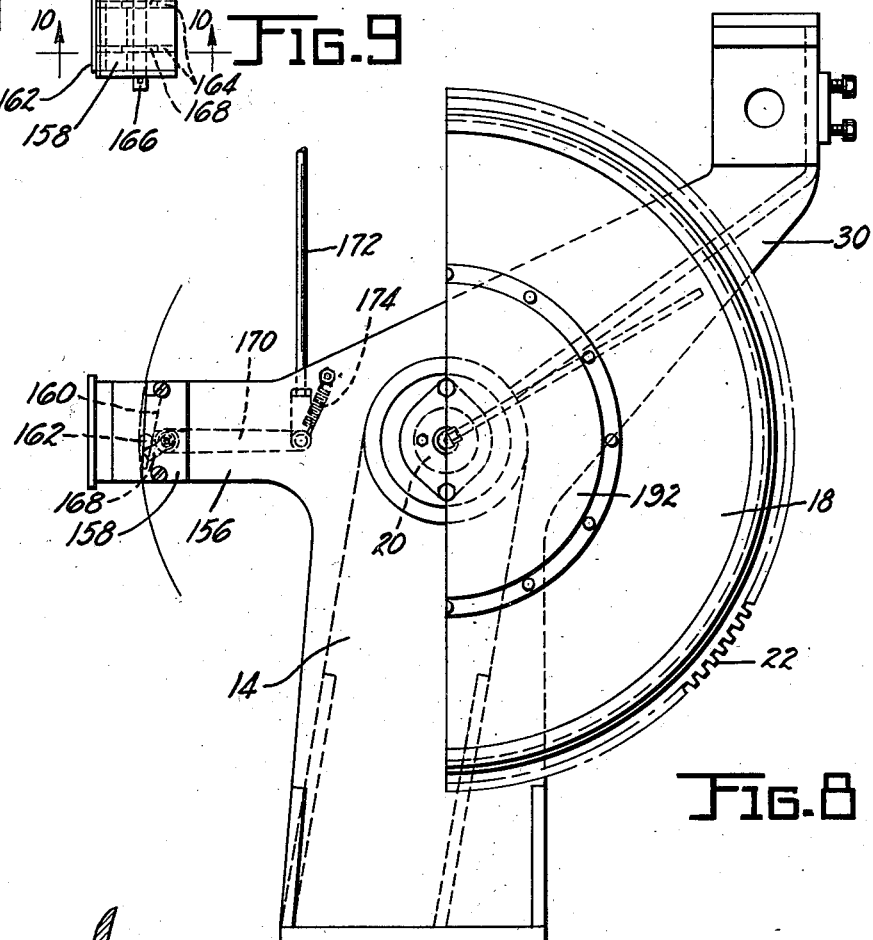
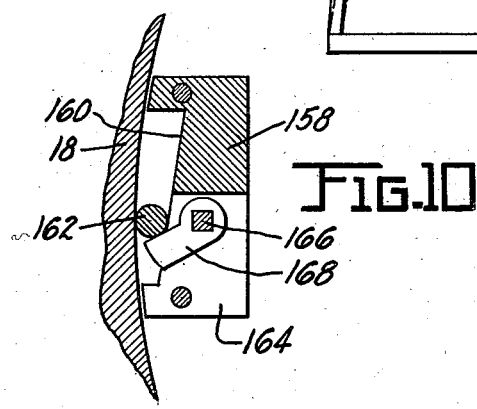

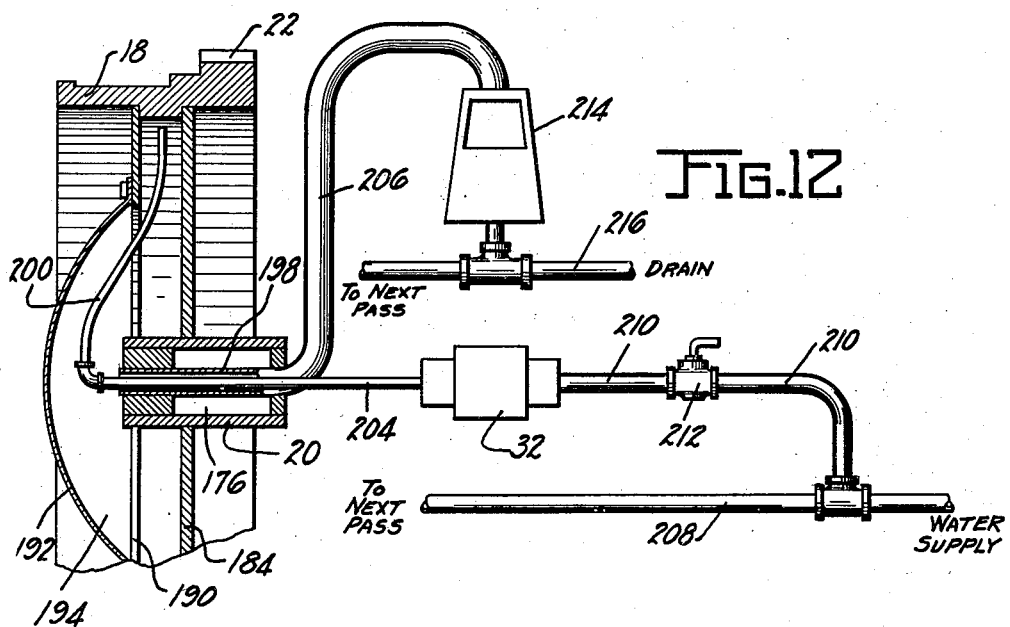
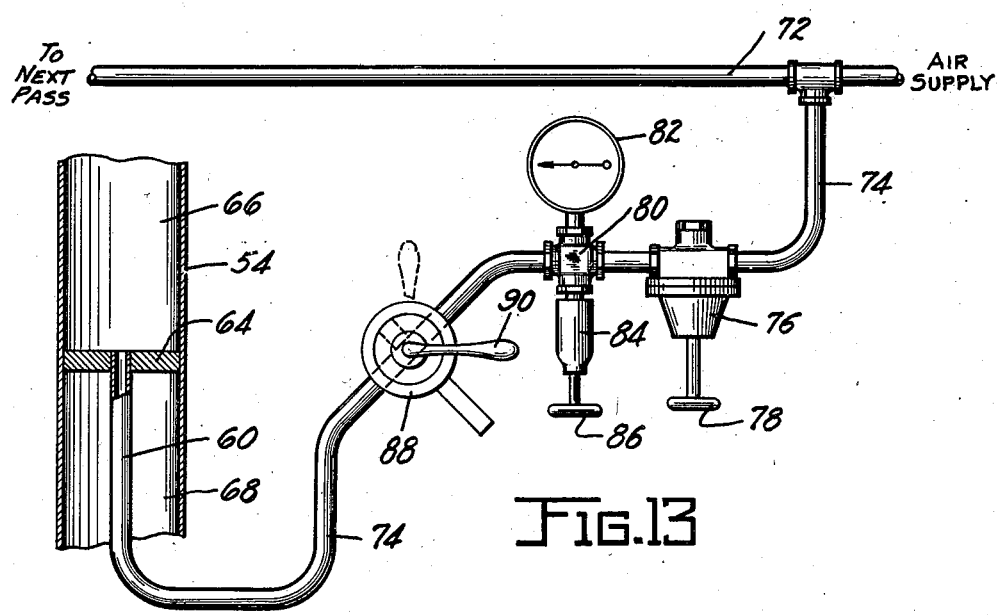

Patented Feb. 23, 1943

2,311,775

UNITED STATES PATENT OFFICE 2,311,775

WIRE DRAWING MACHINE

Robert C. Pierce and Leonard G. Berquist, Niles, Mich., assignors to National Standard Company, Niles, Mich., a corporation of Michigan Application October 27, 1939, Serial No. 301,648

11 Claims. (Cl. 205—14)

This invention relates to wire drawing machines and more particularly machines of the type in which a wire is drawn successively and continuously through a plurality of dies.

An object of the invention is to provide a machine of this type having improved back-tensioning means.

Another object of the invention is to provide a machine of this type having fluid pressure operated back-tensioning devices.

Still another object of the invention is to provide a wire drawing machine having improved means for controlling the speed with which the wire is drawn through the several dies.

Still another object of the invention is to provide greater ease in threading the machine such as by providing manual control means for the fluid pressure operated back-tensioning device.

Still another object is to overcome difficulties encountered by tangling of the wire when the machine is stopped. This tangling may arise from backward turning of the capstans under the influence of the back-tensioning devices and one means of accomplishing the above object is by providing a suitable one-way device in engagement with the capstans.

Another object is to provide improved and easily controlled adjustments in the speed regulating mechanism; and A further object is to provide improved cooling arrangements for the dies and capstans.

The above and other objects and desirable particular arrangements of parts will be apparent upon reading the following detailed description of one embodiment of my invention shown in the accompanying drawings, in which:

Figure 2 is an end elevational view as seen from the right-hand end of Figure 1;

Figure 3 is a front elevational view, on an enlarged scale, of a portion of one of the back-tensioning devices, and its corresponding speed control mechanism;

Figure 4 is a sectional view on the line 4—4 of Figure 3;

Figure 7 is a partial sectional view taken on a plane passing vertically through the axis of one of the capstans;

Figure 8 is a front elevational view of a capstan broken away to reveal the details of the capstan mounting bracket and the one-way device;

Figure 9 is a partial plan view of a capstan mounting bracket showing the one-way device in detail;

Figure 10 is a sectional view on the line 10—10 of Figure 9;

Figure 11 is a front elevational view with parts broken away of a portion of the speed control mechanism;

Figure 12 is a piping diagram of the water cooling mechanism; and

Figure 13 is a piping diagram of the control mechanism for the pneumatic back-tensioning devices.

Figure 1:
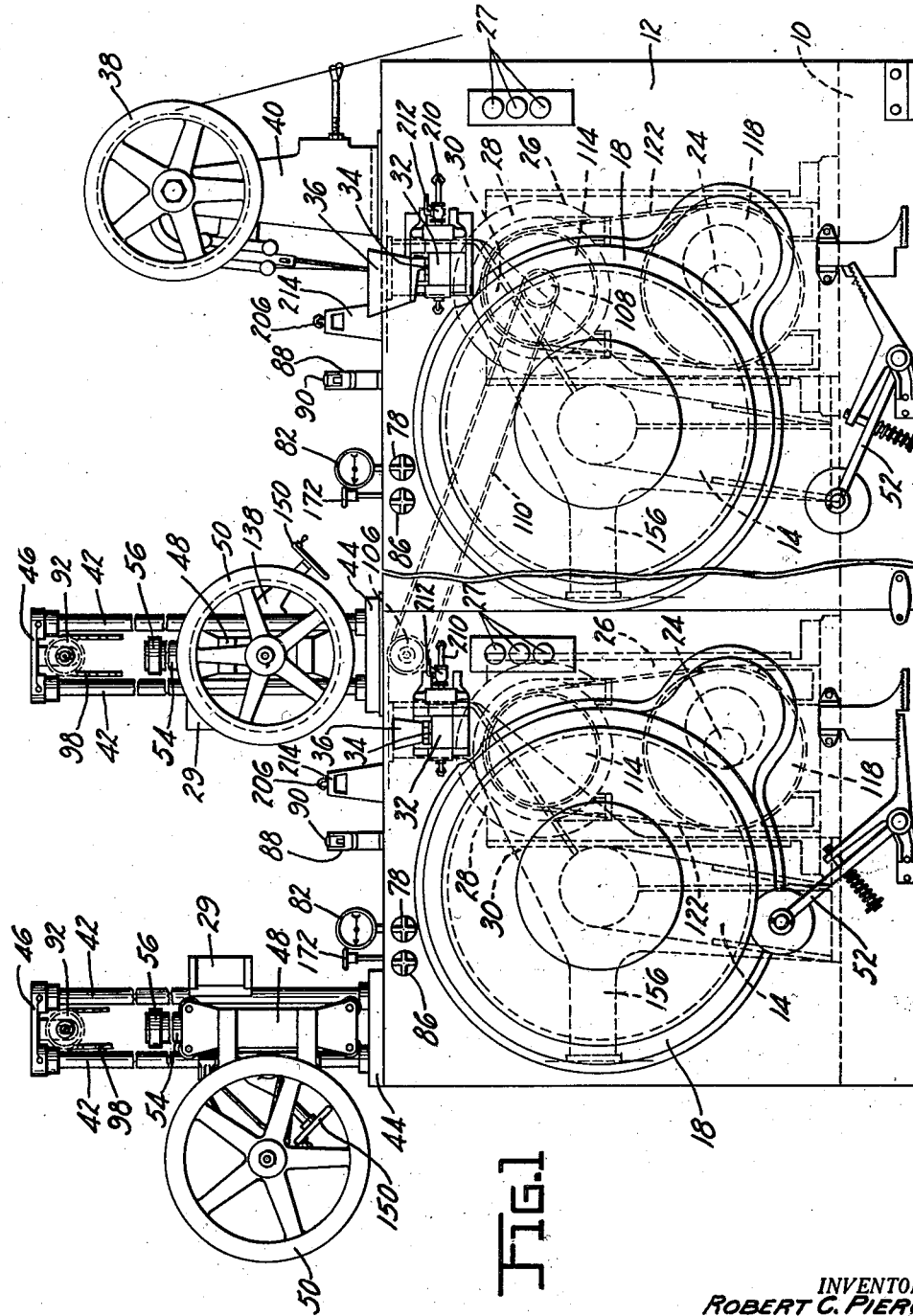
Figure 1 is a front elevational view of my novel machine with the several similar intermediate sections broken out.

Referring now to the drawings, we prefer to build our novel machine in units made up of a die, a capstan, driving mechanism for the capstan, and a back-tensioning device, and these units may be combined in any number from three to seven or more to form a complete machine. The first and last units differ from the others; the first in the elimination of the back-tensioning device, and the last in the addition of a second back-tensioning device with corresponding speed control mechanism for a windup reel, which is not shown. In Figure 1 we have been able to show only a portion of a first unit and a last unit, but it will be understood that several intermediate units would be employed.

Each unit may comprise a base 10 upon which may be erected a box like frame work 12 which may be enclosed with sheets of steel for the purpose of improving the appearance of the machine and for safety. Brackets 14 are secured to the bases and provide journals for shafts 20 carrying capstans 18. The capstans are provided with gear teeth 22 meshing with pinions 24 secured to the driven shafts of Reeves type variable speed transmissions 26 mounted on the bases 10 and driven by electric motors 28. The motors 28 are preferably the squirrel cage induction type for operation on alternating current. The motors may be controlled by push buttons 27 and suitably disposed limit switches 29 connected in a circuit such as that described and claimed in a patent of Richard E. Koontz, No. 2,153,192 granted April 4, 1939.

The brackets 14 may be provided with arms 30 forming rigid supports for adjustable die holders 32 carrying dies 34. The die holders are preferably positioned on a vertical tangent to the entering side of the capstans and the dies are preferably provided with cups 36 for holding a powdered lubricant such as soap.

Wire is conducted from a suitable reel to the die of the first unit over a sheave 38 mounted on a pedestal 40 secured to the top of the frame work 12, the sheave 38 being positioned so that the wire passes vertically downwardly therefrom through the die 34 and on to the capstan 18.

Succeeding units of the machine are each provided with a vertical guide-way comprising two parallel rods 42 having their lower ends seated in suitable brackets 44 secured to the top of the frame work 12 and connected together at their upper ends by a casting 46. A slide 48 is mounted for vertical movement on the guideway thus formed and carries a sheave 50 adapted to receive wire from the capstan of the preceding unit coming substantially vertically upwardly therefrom to pass thereover and thence to vertically downward through the next die and on to the next capstan. The last unit is provided with a similar mechanism, to which the same reference numerals are applied, receiving wire from the last capstan and delivering it to a windup reel (not shown).

Each capstan may be provided with a device 52 for preventing unwinding of the wire therefrom. This device may be of the type disclosed and claimed in a prior application of Robert C. Pierce, Serial No. 237,202, filed October 27, 1938, which issued as Patent No. 2,257,645 on Sept. 30, 1941.

Each of the slides 48 has secured thereto a fluid cylinder 54 closed at its upper end by a cap 56 and having at its lower end a cap 58 having a central opening therein for the passage of a piston rod 60. We prefer to use a compressible fluid such as air in this cylinder although nothing herein is intended to limit the applicability of our invention to the use of other fluids whether compressible or incompressible. The brackets 44 have a rearward and downward extension 62 to which the lower end of the piston rods 60 are connected and the upper ends of the piston rods 60 carry double acting pistons 64. The cylinders 54 are thus divided into two working chambers 66 and 68 and air pressure is supplied to the upper chambers 66 by means to be described later, to exert an upward force on the sheaves 50 and thus create a back tension on the wire being drawn in the machine. The lower chambers 68 are provided with restricted bleed openings 70 which permit the passage of air to and from these chambers rapidly enough to permit normal movements of the slides, but, in the event that the wire should break, prevents rapid movements of the slides which might result in damage to the machine.

Air is provided from any suitable source and is conducted along the machine structure by means of a header pipe 72. At each unit of the machine a conduit 74 branches from the header and passes through a pressure reducing valve 76 which is adjustable by means of a hand wheel 78 and thence through a T-fitting 80, to the branches of which are connected a pressure gauge 82 and a pressure relief valve 84 which is also adjustable by means of a hand wheel 86. The conduit 74 next passes through a manually controllable three-way valve 88 controlled by a handle 90 and thence to the chamber 66 of the respective cylinder 54. The most convenient connection to the chamber 66 is formed by making the piston rods 60 hollow and by connecting the conduits 74 to their fixed lower ends.

The casting 46 at the upper ends of the guideways have rotatably mounted thereon sprockets 92 and the brackets 62 have pivotally mounted therein shaft 94 to which are secured sprockets 96. A continuous sprocket chain 98 extends around the sprockets 92 and 96 and one side thereof is adjustably secured to the slide 48 by means to be described later.

The shafts 94 extend rearwardly of the machine and are connected by mechanism 100 to be described later, to abutting shafts 102 having their far ends pivoted in brackets 104 secured to the rearmost portion of the frame work 12. The shafts 102 carry sprockets 106 drivably connected to sprockets 108 on the Reeves drives of the next preceding unit by means of sprocket chains 110. The sprockets 108 on the Reeves drives control the relationship between the speeds of the driving and driven shafts thereof by connections not important to this invention as the said drive is a standard commercial product.

It is necessary, however, to describe somewhat generally the structure of this transmission in order to appreciate an important minor feature of our invention. The driving shafts 112 of the transmissions (which are connected to the respective motors 28) carry V-belt pulleys made up of opposed cones 114 which are adjusted axially relative to each other by the turning of the sprockets 108. The driven shafts 116 (which are connected by additional reduction gearing to the pin 24, which drive the capstans 18) carry similar pulleys comprising cones 118 which are continuously urged toward each other, such as by springs 120. The two pulleys formed by the cones 114 and 118 respectively are connected by V-belts 122. In order to reduce the speed of the capstans 18 the cones 114 are separated, and this can be accomplished by rotating the sprocket 108 whether the machine is running or stopped since the V-belts 122 will not interfere with such movement. However, if the machine is to be speeded up the cones 114 must be moved towards each other and the belts 122 must be forced out from between the cones and this can be accomplished only when the machine is running.

Consequently, we have provided the devices 100 connecting the shaft portions 94 and 102 to provide positive connections to rotate the sprockets 108 in a direction to decrease the speed of driving and to provide resilient connections to drive the sprockets 108 in the direction to increase the speed. These devices comprise generally cylindrical housings 124 secured to the shaft portions 94 so that portions of said shafts project therein and having the shaft portions 102 rotatably projecting into the other ends thereof. Within the housings helical torsion springs 126 have one end connected to each of the shaft portions 94 and 102. Collars 128 are clamped to the shaft portions 102 adjacent the ends of the housings 124 and are provided with dogs 130 engageable with similar dogs 132 formed on the ends of the said housings. Thus it will be seen that, if the shafts 94 are turned in a direction to decrease the speed of the respective capstans, the dogs 132 engage the dogs 130 and positively turn the shaft 102, but, if the shafts 94 are turned to increase the speed, and, if the transmissions cannot immediately accept the adjustment (e. g. if the machine is stopped) the spring 126 will be wound up and will exert a force on the shaft 102 to turn it when it is possible for the adjustment to be made.

Figure 5:
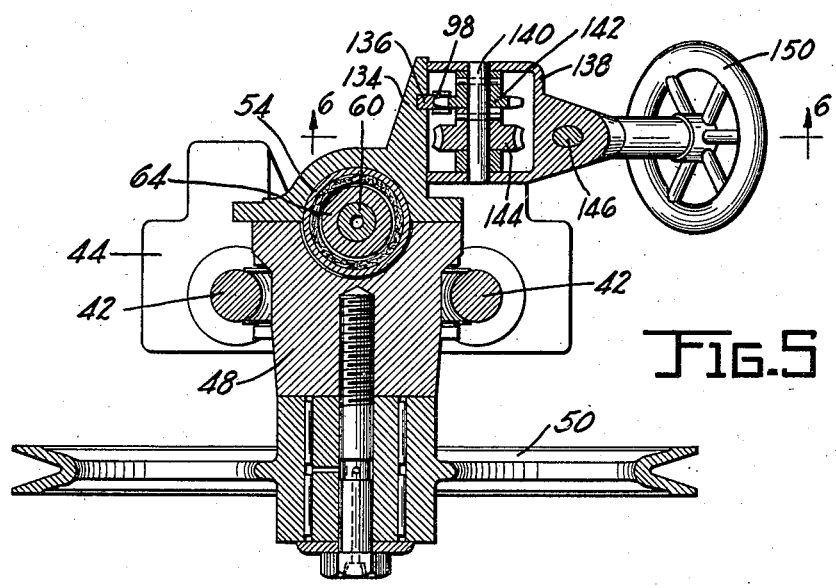
Figure 5 is a sectional view on a still larger scale taken on the line 5—5 of Figure 3.
Figure 6:
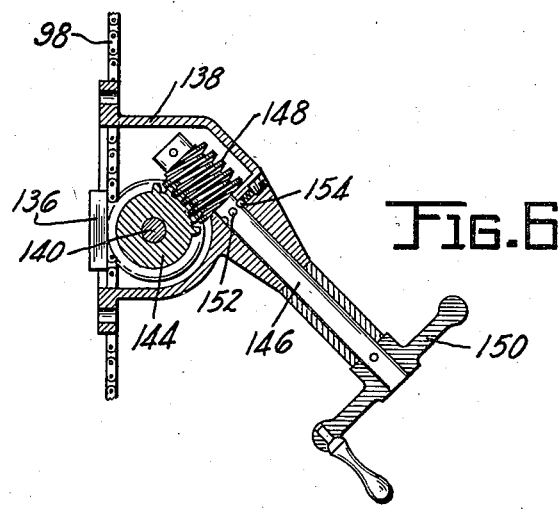
Figure 6 is a sectional view taken on the line 6—6 of Figure 5.

The novel adjustable connections between the slides 48 and the respective sprocket chains 98 is shown in detail in Figures 5 and 6. Brackets 134 project rearwardly from the slides 48 and carry grooved keys 136 over which the sprocket chains 98 slide. Housings 138 are bolted to the brackets 134 and have rotatably mounted therein shafts 140 carrying sprockets 142 and worm wheels 144. The teeth of the sprockets come nearly into contact with the keys 136 so that the chains 98 are securely held between the keys and sprockets. Laterally and downwardly extending shafts 146, rotatably mounted in the housing 138, carry worms 148 meshing with the worm wheels 144. The shafts 146 project out of the housings 138 and carry hand wheels 150 by which they may be turned. The shafts 146 may be formed with indentations 152 receiving spring pressed detents 154 secured in the housings 138 to prevent undesired turning of the shafts through vibration of the machine or the like. It will be understood that, by these novel devices, the point of connection between the chains 98 and the respective slides 48 can be readily changed with a corresponding change in the position of the respective slide for a given speed of the capstan feeding wire thereto.

As an important minor feature of the invention the capstan mounting brackets are provided with laterally extending arms 156 carrying blocks 158 positioned just inside the rims of the capstans (see Figs. 8, 9 and 10). The blocks have cut out portions forming ramp surfaces 160 in relation to the inner surfaces of the capstans. Hardened steel rollers 162 are positioned within the cut out portions so that if the capstans tend to turn in the reverse direction the rollers jam between the said two surfaces and prevent such turning.

The blocks 158 are each formed with a pair of slots 164 paralleling the face of the capstans and a bore paralleling the axes of the rollers. Square shafts 166 project through the bores and carry pairs of fingers 168 in the slots 164. Rearwardly of the arms 156, levers 170 are secured to the square shafts 166 and push rods 172 (projecting above the machine frame for manual operation thereof) are secured to the lever 170. Springs 174, secured to the arms, hold them up so that the fingers 168 are normally retracted in the slots 164. If it is desired to release one of the one-way devices to permit the reverse rotation of the respective capstan, it is only necessary to push down on the push rod 172 to swing the arm 170 and fingers 168 in a clockwise direction until the fingers 168 engage and lift the roller 162 from its jamming engagement between the ramp surface 160 and the inner surface of the capstan rim.

This mechanism prevents difficulties arising when the machine is stopped and started frequently. The tensioning force on the slides 48 sometimes draws the capstans backwardly enough to let the slides go to the top of the guideways. This causes the wire to become so slack that it may loop over itself on one of the capstans with the result that, when the machine is started, the wire is broken. The release is essential for convenience in operating the machine, particularly in threading it.

Another important feature of novelty resides in the arrangements for cooling the dies and capstans. The capstan shafts 20 have already been described as hollow and the passage therethrough may be designated by the reference numeral 176. The shafts are carried in suitable bearings such as the roller bearings 178 in the brackets 14 and have a reduced diameter portion projecting forwardly on to which the hubs 180 of the capstans are keyed. The hubs may be secured in place by plates 182 bolted thereinto and into the ends of the shaft. We prefer to fabricate the capstans by welding and they may generally comprise hubs 180 to which are welded plates 184 forming a web onto the outer periphery of which are secured the rims 186. The rims 186 may be formed integrally with the gear teeth 122 and are also formed with a wide shallow groove 188 in which the wire is wound. Second discs or webs 190, formed with large central openings, are welded to the inner surfaces of the rims at a slight axial distance forward of the main webs 184. The large central openings of the discs 190 are closed by a parti-spherical cap 192 secured by screws or the like on the edges of said openings. It will be noted that this construction provides inclosed hollow spaces 194 within the capstans which communicates with the passages 176 in the capstan shafts 20.

Special pipe fitting 196 positioned at the rear of the shafts 20 in axial alignment therewith are provided with two coaxial tubes 198 and 200. The outer tubes 198 project into the passages 176 and are maintained in sealing relationship with the walls thereof by means of packing glands 202. The inner tubes 200 project entirely through said passages into the chambers 194 in the capstans, and then extend radially through said chambers to points adjacent the rims of the capstans. The ends of these tubes are positioned so that they may discharge water against the inner surfaces of the rims of the capstans a little bit ahead of the point where the wire leaving the dies contacts the outer surfaces of the capstan rims.

The special pipe fitting 196 is constructed so that it may receive a pipe 204 communicating solely with the inner tube 200 and a pipe 206 communicating solely with the annular space between the inner and outer tubes and thus communicating with the passage 176 in the capstan.

The die holders 32 are also formed with suitable water cooling passages in any well known manner and water is conducted to the die holders from a main manifold 208 through conduits 210 branching therefrom at each unit. Each of the conduits 210 may include a valve 212 positioned for easy manual operation. The water is conducted from the respective dies by pipes 204 leading to the adjacent capstans and passes through the tubes 200 to be discharged thereby against the rims of the capstans in the manner before mentioned. The entering water displaces water through the passages 176 into the pipes 206 which discharge through sight feed indicators 214 into a drain manifold 216.

To place our novel machine in operation it is first threaded by conducting a wire from a supply reel (not shown) over the sheave 38 and downwardly through the first die. The wire is then wrapped several times around the first capstan and then is led therefrom over the sheave 50 at the next machine unit and downwardly into the next die, etc. An important advantage of our machine in the performance of the aforementioned threading operation resides in the ease with which the slides 48 may be positioned under the manual control of the three-way valve 88. In the position shown in Figure 13 it will be seen that the valve 88 is admitting air to the chamber 66 so as to tend to raise the slide. By rotating the handle 90 to the position shown in dotted lines in Figure 13, air may be exhausted from the chamber 66 to permit the slide to fall under the influence of gravity. By placing the handle 90 in an intermediate position the passage of air to or from the chamber 66 is completely barred so that the slide 48 is held in any position to which it has been moved. When the machine is completely threaded the valve 90 may be moved to the position shown in full lines in Figure 13, the pressure reducing valve may be adjusted to admit a pressure from the pipe 72 sufficient to exert the desired back tension. This pressure might be 40 lbs. per square inch. The gauge 82 is provided for convenience in setting the desired pressure. The pressure relief valve 84 is then adjusted by the hand wheel 86 to exhaust air from the conduit 74 or chamber 66 if the pressure should rise more than a predetermined amount above the pressure to which the pressure reducing valve is set. In accordance with the previous example given this pressure might be 42 lbs. per square inch. Thus it will be observed that, if one of the slides rises due to the fact that the preceding capstan feeds wire to it faster than the succeeding one takes it away, the pressure in the chamber 66 will tend to fall below the set pressure whereupon the reducing valve 76 will admit additional air to maintain the pressure. If conditions are now reversed, and the slide is drawn downwardly, the pressure in the chamber 66 tends to increase, and, if it increases above the pressure on which the exhaust valve 40 is set, air will escape.

The variable speed transmission of the last unit of the machine is manually adjustable so that a given size of wire may be drawn at a desired rate. With the machine threaded and in operation, all of the other transmissions are controlled by the respective slide 48 immediately succeeding them, thus if a capstan is running too fast the succeeding slide 48 will move upwardly in its guide way drawing the respective sprocket chain 98 with it and thus rotating the shaft 94, the shaft 102 and the sprockets 106 and 108 to lower the speed of the transmission 26 driving said capstan.

If a capstan is rotating too slowly, the reverse motions will take place resulting in the adjustment of the transmission 26 to increase the speed of said capstan. In the event that, when the machine has been placed in operation and the speeds of the several capstans have become established, it is found that the slides 48 remain in a position too near one or the other of their extremes of motion, the respective hand wheels 150 may be rotated in appropriate directions to shift the connections of the said slides and their respective sprocket chains 198 and thus vary the positions of the slides for a given speed of the capstan which is feeding wire thereto. Thus if it is desired to raise the slide the hand wheel 150 may be rotated to the right so that the sprocket 142 is rotated in a counterclockwise direction, as seen in Figure 6. This will result in downward movement of the chain and the slight increase in the speed of the preceding capstan whereupon more wire will be fed to permit the slide to move upwardly as desired as long as the hand wheel is turned.

While one embodiment of our invention has been described in detail it is not our intention that the scope of the said invention be limited to that embodiment or otherwise than by the terms of the appended claims.

What is claimed is:

1. In a wire drawing machine or the like, a die, means on one side of the die for drawing wire through the die, a movable member on the other side of the die over which the wire passes to the die, a fluid cylinder and piston arranged to exert a force on said member to exert a back tension on the wire, means for automatically maintaining a predetermined fluid pressure in said cylinder, and means including a three-way valve for manually regulating said pressure to position said member preparatory to threading the machine.

2. In a wire drawing machine or the like, a die, means on one side of the die for drawing wire through the die, a movable member on the other side of the die over which the wire passes to the die, a fluid cylinder and piston arranged to exert a force on said member to exert a back tension on the wire, and means for maintaining a predetermined fluid pressure in said cylinder, said last-named means comprising a source of pressure, a conduit extending from said source of pressure to said cylinder, a pressure reducing valve, a pressure relief valve and a manually operable three-way valve, said valves being positioned in said conduit in the recited order with said three-way valve nearest said cylinder.

3. In a wire drawing machine or the like, a die, means on one side of the die for drawing wire through the die, a movable member on the other side of the die over which the wire passes to the die, a fluid cylinder and piston arranged to exert a force on said member to exert a back tension on the wire, means for varying the speed of feeding of the wire, connections from said movable member to said speed varying means, and readily adjustable means in said connections for varying the position of said movable member for a given speed of feeding.

4. In a wire drawing machine or the like, a die, means on one side of the die for drawing wire through the die, a movable member on the other side of the die over which the wire passes to the die, a fluid cylinder and piston arranged to exert a force on said member to exert a back tension on the wire, means for varying the speed of feeding of the wire, and connections from said movable member to said speed varying means including a sprocket chain extending along the path of said member, a sprocket on said member meshing with said chain and manually operable means for rotating the sprocket to vary the position of said member for a given speed of feeding.

5. In a wire drawing machine or the like, wire feeding means, and speed control mechanism for the wire feeding means including a member movable in accordance with variations in the feeding of the wire, a speed varying device, and connections between the speed varying device and the member to vary the speed in accordance with the movements of said device, said connections including an endless sprocket chain having a portion extending in the path of movement of said member, a sprocket secured to said member and meshing with said chain, and manual means for rotating said sprocket.

6. In a machine for treating material in strip form, a movable member, a control device, and a variable connection between said member and said device including a sprocket chain extending in the path of movement of said member, a shaft mounted on said member, a sprocket secured to the shaft and meshing with the chain, and means normally holding said shaft but permitting manual rotation thereof.

7. In a multiple wire drawing machine, a plurality of dies, a plurality of capstans for drawing wire through the dies, a plurality of devices for tensioning the wire as it passes from one capstan to a succeeding die, said devices including a movable member and a fluid cylinder and piston acting between said member and a fixed part of the machine, and a one-way device engaging each capstan for preventing backward rotation of the capstan under the influence of said tensioning devices when the machine is stopped.

8. In a multiple wire drawing machine, a plurality of dies, a plurality of capstans for drawing wire through the dies, a plurality of devices for tensioning the wire as it passes from one capstan to a succeeding die, and a one-way device engaging each capstan for preventing backward rotation of the capstans under the influence of said tensioning devices when the machine is stopped.

9. In a multiple wire drawing machine, a plurality of dies, a plurality of capstans for drawing wire through the dies, tensioning devices for tensioning the wire as it passes from one capstan to a succeeding die, a one-way device engaging each capstan for preventing backward rotation of the capstans under the influence of said tensioning devices when the machine is stopped, and manually operable means for releasing said one-way devices.

10. In a wire drawing machine, a plurality of dies, a plurality of capstans for drawing wire through the dies, motors for driving the capstans, driving mechanism between the motors and capstans including a speed varying mechanism of the Reeves type, wire tensioning devices between each capstan and the succeeding die including a movable member over which the wire passes, and connections between said movable member and the speed varying device of the respective capstan including a rotatable shaft divided into two abutting sections and positively joined for rotative driving in a direction to decrease the speed of the capstan and resiliently joined for rotative driving in a direction to increase the speed of the capstan, said resilient joining being accomplished by means of a torsion spring having an end joined to each of said abutting sections.

11. In a machine of the class described, a variable speed mechanism of the Reeves type and automatic control means therefor including two abutting shaft sections, members secured to said shaft sections having projecting lugs engageable to enable one shaft section to positively drive the other in one direction, and a torsion spring having an end connected to each shaft section to provide a resilient driving connection between the shaft sections in the other direction.

ROBERT C. PIERCE.
LEONARD G. BERQUIST.